Patented Jan. 2, 1934

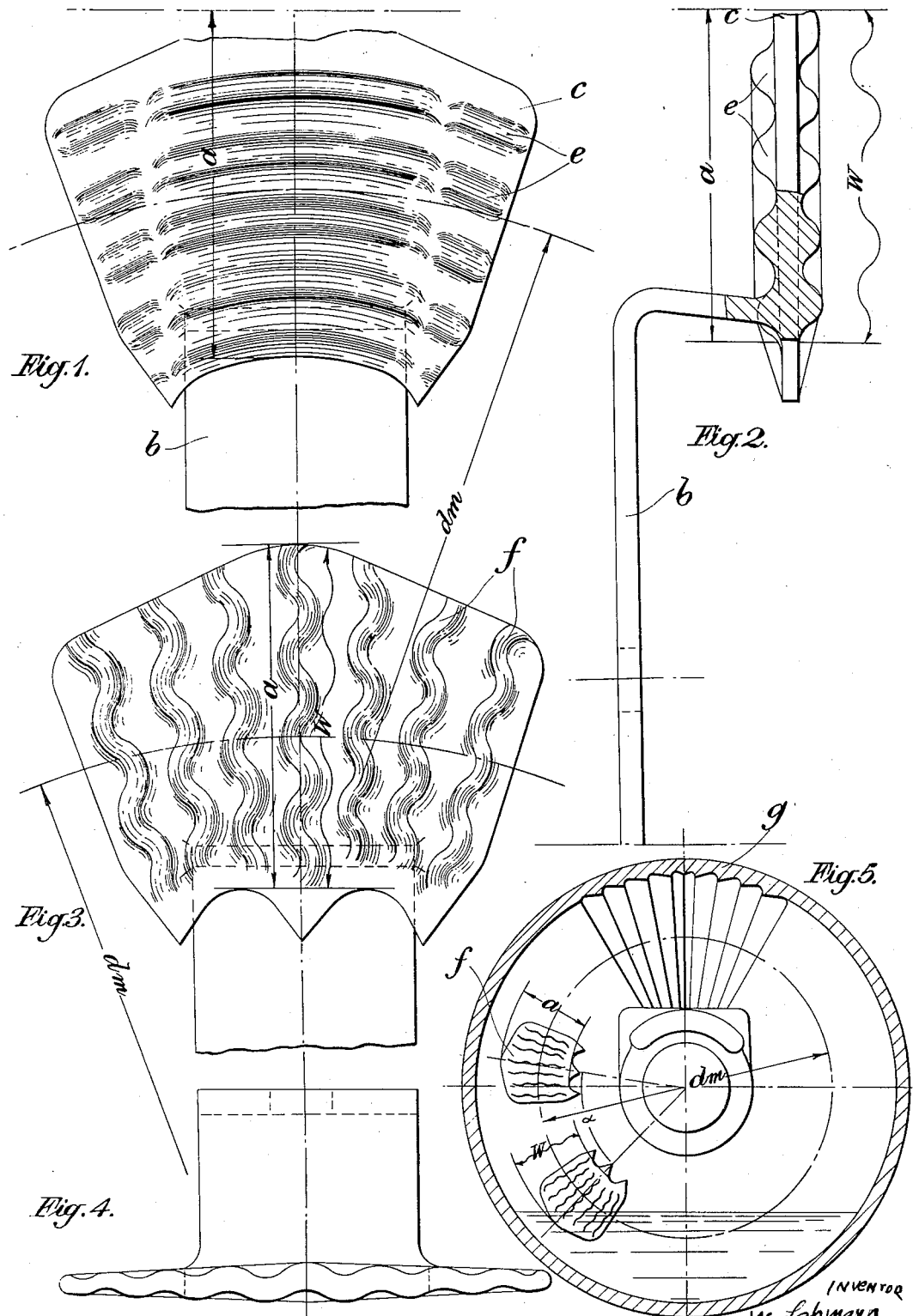

1,941,946

UNITED STATES PATENT OFFICE 1,941,946

LUBRICATING OF AXLE BEARINGS FOR RAIL VEHICLES

Walter Lehmann, Barmen, Germany, assignor to Walter Peyinghaus, Egge, Germany

Application August 5, 1931, Serial No. 555,304, and in Germany August 5, 1930

2 Claims. (Cl. 308—86)

This invention relates to the centrifugal lubrication of the axle bearings of rail vehicles. The surface of the oil thrower plate, which is the determining factor for the conveyance of the oil, has hitherto been designed experimentally in various ways. Besides a smooth plane surface there are plates with radial slots or tubes, which are intended to improve the conveyance of oil at low speeds, and there are also plates having tubular or scoop-like structures mounted thereon, which are intended to overcome what may be described as the critical centrifugal point (regarding centrifugal force as being analogous to the force of gravity) with a scooping and at the same time a ventilating action. This differing design of the thrower plate has merely been the expression, varying from time to time, of individual observations based on particular experiments carried out in different cases.

The present invention, however, is the result of a systematic investigation, founded on the science of dynamics, of centrifugal conditions.

One constructional example of centrifugal lubricating means according to the invention is diagrammatically illustrated in the accompanying drawing, in which Figure 1 is a side view, and Figure 2 a cross section of a thrower plate corrugated concentrically with the axle.

Figure 3 is an elevation, and

Figure 4 a plan of a radially corrugated thrower plate.

Figure 5 is a cross section through the centrifugal casing in the plane of the thrower plate, with the bearing bush in elevation.

In this drawing, $b$ denotes a centrifugal arm secured radially to the axle of a railway vehicle, and $c$ an oil thrower plate secured to the outer end of the arm $b$, $e$, $e$ are circumferential corrugations in the plate $c$ in Figures 1 and 2, and $f$, $f$ are sinuous radial corrugations in the thrower plate $c$ in Figures 3 and 4. $g$ is a centrifugal casing enclosing the bearing. $a$ is the radial length of the oil thrower plate, $w$ the path of slip of a drop of oil along the thrower plate, $dm$ the mean centrifugal diameter of the arm $b$, and $\alpha$ an angle of rotation hereinafter referred to.

The problem that a centrifugal lubricator has to solve, namely that of conveying oil from an oil bath $h$ arranged in the bottom of the casing $g$, to the top of the casing, from which it is to run to the bearing position, would not admit of being solved at all with a smooth and short thrower plate arranged at the end of a centrifugal arm of large centrifugal diameter, because the oil taken up by the plate would already be thrown off under the action of centrifugal force in the lateral sector of the centrifugal casing, somewhat above the centre of the axle, against the wall of the casing, and therefore could not flow to the bearing.

The assumption for effective centrifugal lubrication is therefore that the oil should be thrown off after traversing a definite angle $\alpha$, which must be between 90° and 150°, from the point at which the thrower plate leaves the surface of the oil in the oil bath and must be independent of the speed at which the vehicle is moving, or in other words independent of the speed of revolution of the axle.

(1) This angle of rotation $\alpha$ will now be calculated, assuming the condition that the centrifugal rotation time $t_s$ is equal to the slipping time $t_w$ of the drop along the surface of the thrower plate, and taking into consideration the centrifugal force Z, which imparts to the drop, upon its arrival at the throw-off edge of the plate, a definite kinetic energy, first of all without regard to the retarding effect of cohesion or to the initially accelerating but subsequently retarding effect of centrifugal force. On this basis the following equation is obtained for the angle of rotation:—

$$(2) \quad \alpha = \frac{360°}{\pi} \cdot \frac{w}{a} \cdot \sqrt{\frac{a}{dm}}$$

This equation, in which $w$ denotes the actual path of slip traversed by the drop in passing over the surface of the thrower plate, $a$ the radial length in a straight line from the beginning to the end of the path of slip $w$ in a vertical transverse plane, and $dm$ the mean centrifugal diameter of the thrower plate, is obtained from the following relationships:—

$$(3) \quad \alpha = 360° \cdot \frac{n}{60} \cdot t_s;$$

$$(4) \quad t_w = \frac{w}{\frac{1}{2}(v_z - v_o)};$$

$$(5) \quad Z \cdot a = \frac{m}{2} \cdot (v_z^2 - v_o^2);$$

$$(6) \quad Z = m \cdot \frac{dm}{2} \omega^2$$

In these equations $\alpha$ denotes the angle of rotation of the arm $b$ and thrower plate $c$, $n$ the speed of the axle in revolutions per minute, $t_s$ the time of revolution of the centrifugal members, $t_w$ the time of slip of the drop of oil along the surface of the thrower plate, $v_o$, $v_m$, $v_z$ the initial, mean and final velocities of the drop of oil on the thrower plate surface, Z the centrifugal force, $m$ the mass of a drop of oil, and $\omega$ the angular velocity=

$$\frac{\pi n}{30}.$$

From the relationship (1) above:—$t_s = t_w$, since $v_o = o$, the relationship expressed by the Equation (2) above is obtained for the angle of rotation $\alpha$, from which in the first place the important fact is ascertained that the drop of oil, when the ratios of the thrower plate and the centrifugal arm remain unaltered, is always thrown off after traversing the same angle of rotation $\alpha$, irrespectively of the angular velocity of the axle, that is to say, of the speed of the vehicle.

From Equation (2), however, it also follows that the ratio of $w$ to $a$, that is to say, the ratio of the length of the path of slip of a drop of oil on the thrower plate surface to that surface, has a definite influence on the angle of rotation of the centrifugal arm, after which the oil is thrown off.

For the given conditions of the axle lubrication in rail vehicles, that is to say, constant centrifugal diameter $dm$, and radial drop path $a$ only variable within narrow limits, it follows that the actual path of slip $w$ of a drop of oil must be from one-and-three-quarters to two-and-a-half times the radial length of the path $a$ measured in a straight line, if an angle of rotation of from 90 to 150° from the point at which the thrower plate leaves the oil bath is to be attained before the oil is then thrown off. This artificial prolongation of the path of slip of the drop is according to the invention obtained by corrugating or notching the surface of the plate in the constructional forms illustrated in Figures 1 and 2 and in Figures 3 and 4. In the limiting case of a smooth plane plate surface, where $a=w$, the angle of rotation $\alpha$ for the dimensions of the centrifugal casing that are usual in freight cars would be 54°, so that with this construction of the surface the oil leaves the thrower plate much too soon and cannot reach the catch troughs of the bearing brass.

The large clearance space which was indicated above for the angle of rotation $\alpha$, namely 90 to 150° is obtained from the breadth of the centrifugal zone which has to be provided in the upper centrifugal casing, for the purpose of providing the oil distributing ducts of the journal brass uniformly with oil. The thrower plate surface is accordingly to be subdivided into sectors which have slip paths $w$ of different lengths, in order to obtain a differentiation of the angle of rotation $\alpha$ between 90 and 150° and therefore a uniform distribution of oil over the entire breadth of the centrifuging zone.

The relationships developed above were obtained without regard to the action of gravity and the adhesion of the oil to the plate, which, according to the position of the centrifugal arm, and the degree of viscosity of the oil, exert a more or less retarding action upon the centrifuging of the oil. The effect of these forces practically disappears at vehicle speeds above 30 kilometres an hour. At speeds ranging from 15 to 30 kilometres per hour a retardation of the centrifuging, that is to say, an increase of the angle of rotation by from 10 to 20°, as compared with the position given by the degree of sinuosity of the plate surface $$\left(\frac{w}{a}\right)$$

occurs, but only when the temperature of the oil remains below 30° C. This influence has been ascertained by reference to the equation for the shearing force between two layers of oil moving past one another:—

$$R = \frac{n}{981} \cdot F \cdot \frac{dv}{ds} = \frac{n}{981} \cdot \frac{1}{1} \cdot v$$

centimetres per second for a drop of oil having a volume of 1 cubic centimetre.

The shearing force only affects the angle of rotation to an inconsiderable extent, because it exerts an accelerating effect upon the centrifuging in the lower sector of the casing and a retarding effect in the upper sector.

The influence of these two forces (cohesion and gravity) upon the angle of rotation is also not considerable, because the force Z driving the drop of oil occurs under a root sign and in the numerator of Equation (2) for the angle of rotation.

Within a definite low range of speeds, corresponding approximately to the speed of travel of from 11 to 13 kilometres per hour of a freight car on the German state railways, these retarding forces are of the order of magnitude of the centrifugal force. There is therefore in this region a speed at which the retarding forces and the centrifugal force balance one another, and drops of oil neither drip off nor are thrown off. This critical point admits of being the better bridged over, the greater the length $a$ of the plate. During the starting and during the braking of the vehicle it travels radially, as a circular line, over the surface of the plate.

What I claim is:—

1. Centrifugal lubricating means for the axle bearings of rail vehicles, comprising a centrifugal arm secured radially to the axle of the vehicle, an oil thrower plate at the outer end of the centrifugal arm, and corrugations in the oil thrower plate, the corrugations being so arranged and being of such depth that drops of oil passing from the inner edge of the oil thrower plate to the outer edge in a substantially radial direction are constrained to traverse a sinuous path the length of which is considerably greater than the radial distance between the said edges measured in a straight line.

2. Centrifugal lubricating means for the axle bearings of rail vehicles, comprising a centrifugal arm secured radially to the axle of the vehicle, an oil thrower plate at the outer end of the centrifugal arm, and corrugations in the oil thrower plate, the corrugations being so arranged and of such depth that the path actually traversed by drops of oil in passing from the inner edge of the oil thrower plate to the outer edge is considerably greater than the radial distance between these edges, the corrugations differing from one another in different sectors of the oil thrower plate, so that the ratio of the distance actually traversed by drops of oil in passing across the plate to the direct radial distance across the plate is different in different sectors.

WALTER LEHMANN.